(No Model.)
J. M. LAME & I. N. PHIPPS.
NUT LOCK.
No. 477,555.　　　　　　　　Patented June 21, 1892.
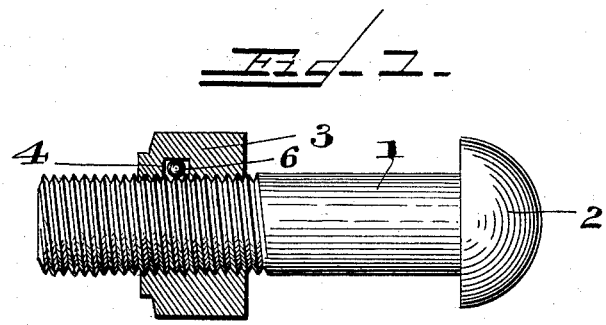
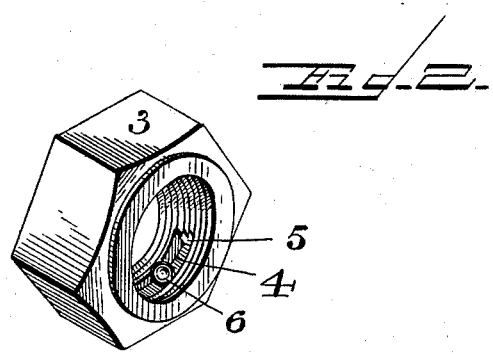
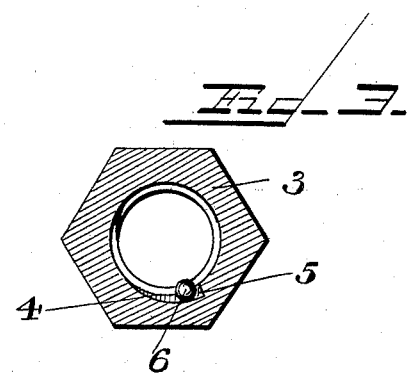
Witnesses:
F. L. Ourand
W. D. Coombs
Inventors:
John M. Lame and
Isaac N. Phipps,
by Saul Baggett & Co.
Attorneys.

UNITED STATES PATENT OFFICE.

JOHN MORTEN LAME, OF MOREHEAD, AND ISAAC NEWTON PHIPPS, OF MOUNT STERLING, KENTUCKY.

NUT-LOCK.

SPECIFICATION forming part of Letters Patent No. 477,555, dated June 21, 1892.

Application filed July 27, 1891. Serial No. 400,882. (No model.)

*To all whom it may concern:*

Be it known that we, JOHN MORTEN LAME, of Morehead, in the county of Rowan, and ISAAC NEWTON PHIPPS, of Mount Sterling, in the county of Montgomery, State of Kentucky, have invented certain new and useful Improvements in Nut-Locks; and we do hereby declare that the following is a full, clear, and exact description of the invention, which will enable others skilled in the art to which it appertains to make and use the same, reference being had to the accompanying drawings, which form a part of this specification.

Our invention relates to improvements in nut-locks.

The object of the invention is to provide a simple and economical construction of nut-locking devices, whereby a nut may be securely held in place upon a bolt.

The invention consists in the novel construction and combination of parts, hereinafter fully described and claimed.

In the accompanying drawings, Figure 1 is a sectional view of a nut and bolt constructed in accordance with our invention. Fig. 2 is a perspective view of the nut. Fig. 3 is a sectional view of the same.

In the said drawings, the reference-numeral 1 designates a bolt, screw-threaded, as usual, and having a head 2. The numeral 3 denotes the nut having a central screw-threaded aperture corresponding with said bolt. In its inner or screw-threaded portion the nut is provided with a beveled recess 4—that is to say, the back wall of said recess is eccentric to the axis of the nut, forming at one end thereof a pocket 5. In this pocket is seated a metallic ball or sphere 6.

The operation is as follows: The nut is applied to the bolt in the ordinary manner, the ball or sphere being held in the pocket 5 during the operation of screwing the nut home. Any backward movement of the ball or sphere is prevented, as the slightest tendency in that direction causes said ball to be wedged between the beveled wall of the recess and the screw-thread of the bolt. This will be sufficient under all ordinary circumstances to securely lock the bolt in place. When it is desired to remove the nut, a wrench is engaged therewith and power applied to turn the same backward or in a reverse direction, which will cause the ball or sphere, if of soft or yielding metal, to be flattened, when the nut can be readily unscrewed. If a steel ball is used, the nut cannot be removed.

From the above it will be seen that when the nut is applied to a bolt there is no communication whatever from the outside with the recess, and it is only possible to remove the nut by applying sufficient power to flatten the ball or sphere, which, if made of a soft yielding metal, can readily be accomplished; but if of steel the ball cannot be removed except by applying force sufficient to wrench it backward, thereby destroying the threads on the bolt or bursting the nut open, one of which will surely occur.

Having thus described our invention, what we claim is—

The combination, with a screw-threaded bolt, of a nut having a screw-threaded aperture and a horizontal recess in said aperture, closed at the sides and having its bottom eccentric to the axis of the nut, and a soft metal ball or sphere located in said recess, adapted to be free from engagement with the threads on the bolt in screwing the nut on the bolt and to engage with the threads to prevent accidental backward movement of the nut, but capable of being flattened when sufficient force is applied to unscrew the nut, substantially as described.

In testimony that we claim the foregoing as our own we have hereunto affixed our signatures in presence of two witnesses.

JOHN MORTEN LAME.
ISAAC NEWTON PHIPPS.

Witnesses to Lame's signature:
B. W. COLLINS,
JACOB C. MAXEY.

Witnesses to Phipps' signature:
C. G. RAGAN,
BEN W. HALL.